United States Patent [19]

Maeda et al.

[11] 4,424,556

[45] Jan. 3, 1984

[54] SELF-OSCILLATING DC TO DC CONVERTER

[75] Inventors: Mikio Maeda, Katano; Masahiro Kosaka, Suita; Katsuhiko Higashiyama, Neyagawa, all of Japan

[73] Assignee: Matsushita Electric Industrial Co., Ltd., Osaka, Japan

[21] Appl. No.: 292,445

[22] Filed: Aug. 13, 1981

[51] Int. Cl.³ .......................................... H02M 3/335
[52] U.S. Cl. ............................... 363/17; 331/113 A; 363/22; 363/56; 363/132; 363/133
[58] Field of Search ............... 331/113 A; 363/17, 22, 363/23, 56, 97, 98, 132, 133

[56] References Cited

FOREIGN PATENT DOCUMENTS

| 54-104534 | 8/1979 | Japan | 363/17 |
| 54-145915 | 11/1979 | Japan | 363/17 |
| 598202 | 2/1978 | U.S.S.R. | 363/133 |

Primary Examiner—William H. Beha, Jr.
Attorney, Agent, or Firm—Wenderoth, Lind & Ponack

[57] ABSTRACT

A self-oscillating DC to DC converter which includes either two or four transistors, three transformers (a converting transformer, a driving transformer and a current transformer) and an inductance.

The operating frequency of the converter is fixed by the saturation time of the driving transformer. The base currents of the transistors are mainly supplied by the current transformer so as to be in proportion to the collector currents of the transistors. The operating frequency of the converter is kept constant in spite of load fluctuations. The inductance which is connected in series between a winding of the converting transformer and a winding of the driving transformer. The inductance prevents the two or four transistors from being 'on' simultaneously.

2 Claims, 8 Drawing Figures

U.S. Patent  Jan. 3, 1984  Sheet 1 of 3  4,424,556
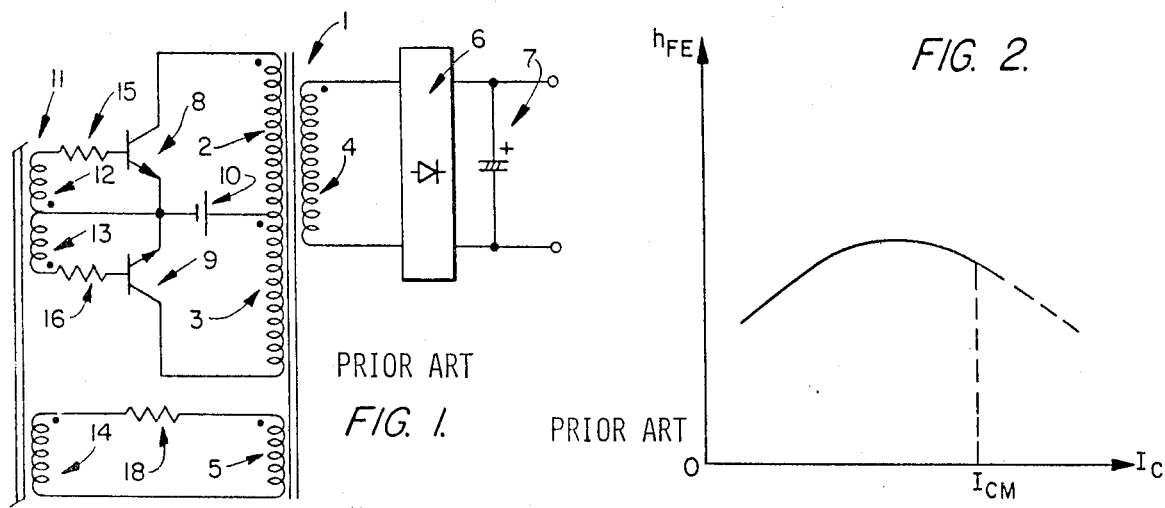
FIG. 1. PRIOR ART
FIG. 2. PRIOR ART
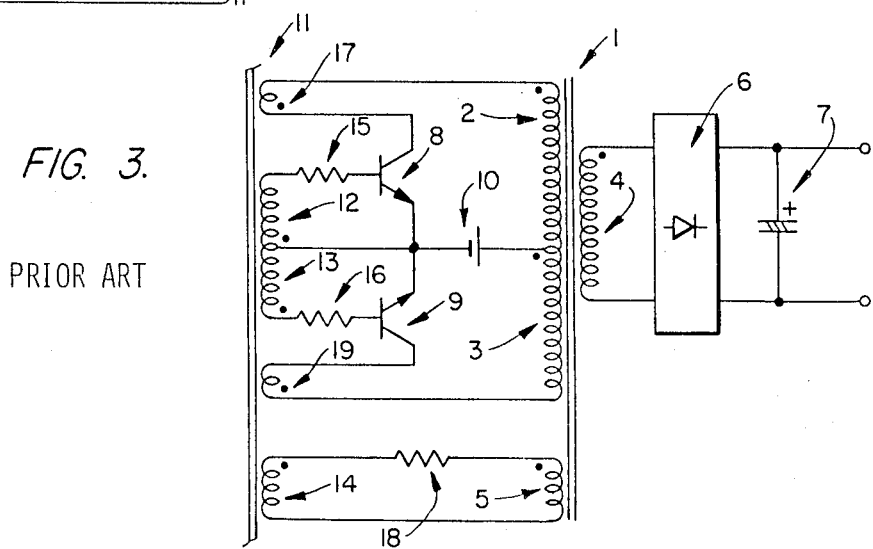
FIG. 3. PRIOR ART
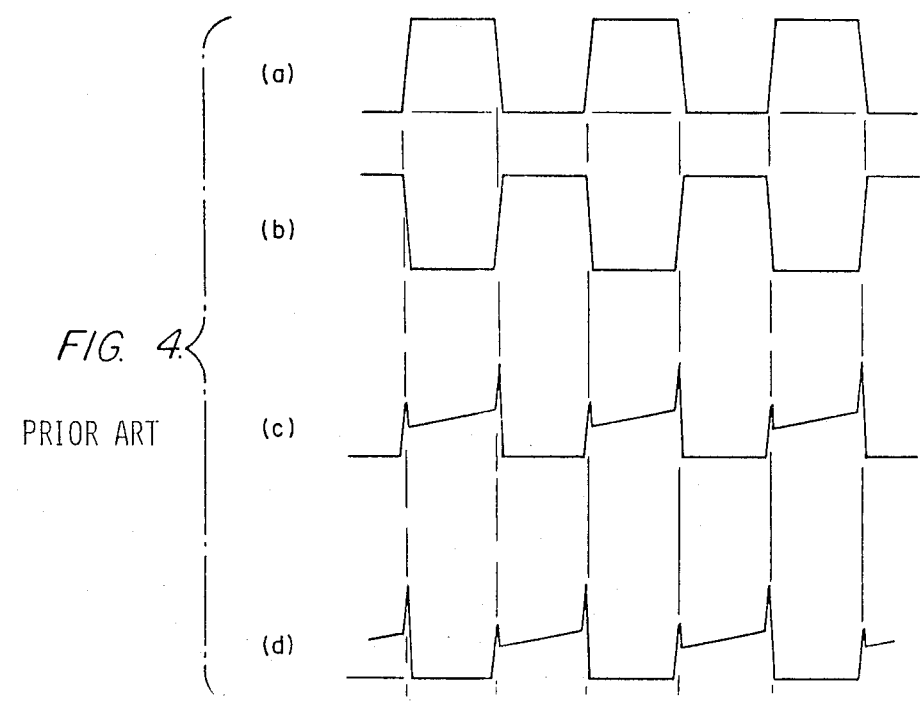
FIG. 4. PRIOR ART

SELF-OSCILLATING DC TO DC CONVERTER

BACKGROUND AND SUMMARY OF THE INVENTION

The present invention relates to a self-oscillating DC to DC converter. The converter comprises either two or four transistors, three transformers (i.e.—a converting transformer, a driving transformer, and a current transformer), and an inductance.

The operating frequency of the converter is fixed by the saturation time of the driving transformer. The base currents of the transistors are supplied by the current transformer so as to be in proportion to the collector currents of the transistors. Accordingly, the operating frequency of the converter is kept constent irrespective of load fluctuations. The inductance is connected in series between a winding of the converting transformer and a winding of the driving transformer so as to prevent the two or four transistors from being simultaneously on.

This invention is concerned with an improvement of a two tranformer self-oscillating DC to DC converter which is called "the Jensen circuit". The purposes of the invention are to obtain higher efficiency and a higher reliability and to keep the operating frequency constant in spite of load fluctuations.

BRIEF SUMMARY OF THE INVENTION

Hereinafter, this invention will be detailed with the aid of the accompanying drawings in which:

FIG. 1 shows a conventional two transformer self-oscillating DC to DC converter with two transformers;

FIG. 2 shows a direct current $h_{FE}$ of a transistor versus its collector current;

FIG. 3 shows a conventional self-oscillating DC to DC converter with a current feedback transformer;

FIG. 4 shows operating waveforms of a conventional self-oscillating DC to DC converter;

DESCRIPTION OF THE PREFERRED EMBODIMENT

Figure 5:
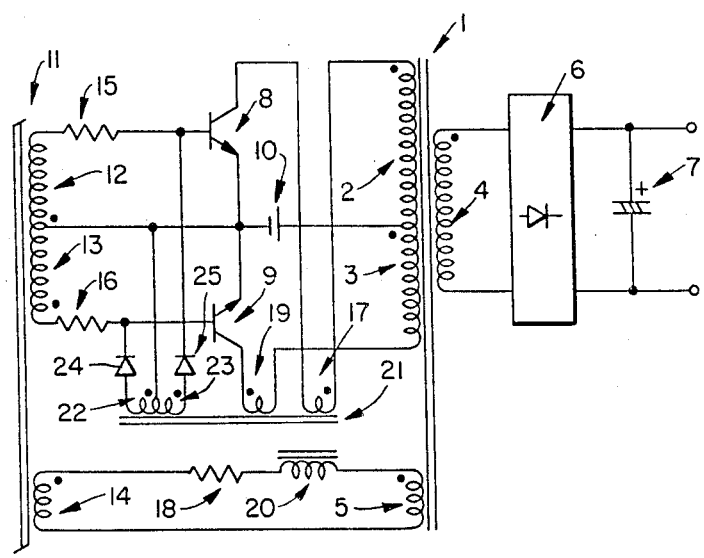
FIG. 5 shows a circuit in accordance with the present invention.

FIG. 1 shows a conventional two transformer self-oscillating DC to DC converter. A converting transformer 1 is composed of two primary windings 2 and 3, a secondary winding 4 and a feedback winding 5. The secondary winding 4 is connected to a diode arrangement 6 and a capacitor 7. A start and an end of the primary winding 2 are connected to a collector of a transistor 8 and a power supply 10, respectively. A start and an end of the primary winding 3 are connected to the power supply 10 and a collector of a transistor 9, respectively. A driving and oscillating transformer 11 is composed of two base windings 12 and 13 and a feedback winding 14. A start of the base winding 13 is connected to a base of the transistor 9 through a resistor 16, an end of the base winding 13 is connected to a start of the base winding 12 and a negative side of the power supply 10. An end of the base winding 12 is connected to a base of the transistor 8 through a resistor 15. The emitters of the transistors 8 and 9 are connected to the negative side of power supply 10. A start of the feedback winding 5 is connected to a start of the feedback winding 14 through a resistor 18. Ends of the feedback windings 5 and 14 are directly connected to each other.

The circuit of FIG. 1 works as follows:

When the transistor 9 is "on" and the transistor 8 is "off", the primary current flows from the power supply 10 to the transistor 9 through the winding 3 a voltage across the winding 5 is induced. As the result thereof, a feedback current flows from the winding 5 to the winding 14 through the resistor 18. By the feedback current, a voltage is induced across the winding 13 so that the transistor 9 may saturate, and a voltage is induced across the winding 12 so that the transistor 8 may be cut off. Since the feedback current increases linearly, the transformer 11 eventually saturates. As the result thereof, the induced voltage across the winding 14 changes its polarity, the feedback current flows in the opposite direction and the transistor 9 changes state so as to be off and the transistor 8 changes state so as to be on.

When the transformer 11 saturates again, the transistor 9 returns to its on state and the transistor 8 returns to its off state. The interchanging states of the transistors 8 and 9 from on to off keeps the oscillation and supply load currents flowing through the converting transformer 1. Suppose that the respective base current of transistors 8 and 9 is $I_{B1}$ and $I_{B2}$, the feedback current is $I_f$ and the transformer 11 is an ideal transformer, the following equation results:

$$V_{B1} \times I_{B1} = V_f \times I_f \quad (1)$$

where $V_{B1}$ is a voltage across the winding 12 and $V_f$ is a voltage across the winding 14.

FIG. 2 shows a direct current amplitude ratio ($h_{FE}$) of a transistor. Generally speaking, the $h_{FE}$ is non-linear and tends to decrease rapidly near the maximum collector current ($I_{CM}$). If the collector current of a value near the $I_{CM}$ flows at the full load, a large amount of base current may be required in order to keep the transistor in its deeply saturated state. For example, if the collector current at full load is 10[A], then and $h_{FE}$ is 8 at $I_c = 10$[A], the base current must be over $$2.5 \left( = \frac{10}{8} \times 2 \right) [A].$$

From equation (1), the more base current needed, the more feedback current $I_f$ needed. As a result, the losses of the resistor 18 increase and the efficiency and the reliability decrease. There is a way to solve this problem. The way is to add another winding to the transformer 11 so as to provide base currents which are proportional to the collector currents. FIG. 3 shows this circuit. In FIG. 3, winding 17 and 19 are respectively connected in series with trantransistors 8 and 9, so that their base currents may increase in proportion to their collector currents. In FIG. 3, the following equation results:

$$I_{B1} \times V_{12} I_f \times V_f + I_c \times V_{17} \quad (2)$$

where $V_{12}$ is a voltage across the winding 12, $V_{17}$ is a voltage across the winding 17, and $I_c$ is the collector current of the transistor 8.

The equation (2) shows that the base currents increase in proportion to the collector currents so that the transistor may saturate deeply at the full load. In this case, however, the operating frequency of the DC to DC converter increases in proportion to the amount of the feedback current. The reason is that the operating frequency is fundamentally fixed by the variance of the magnetic fluxes with respect to time. These magnetic fluxes depend on the voltage across the windings 17 or 19 and on the voltage across the windings 13 or 12. In order to make the transistor deeply saturated, it is necessary to increase the amount of the feedback current. As the result, the operating frequency increases, the switching losses of the transistors and of the output rectifying diode arrangement increase and the hysteresis loss of the converting transformer increases. Thus, the efficiency and reliability of the circuit decrease.

There is another factor for decreasing the efficiency and reliability. In FIG. 1, it happens that the transistor 8 turns on and the transistor 9 turns off at the same time. During the turning on and off of the two transistors, both of the transistors are on simultaneously. Thus, currents from the power supply 10 flow to both transistors 8 and 9, and the inductance of the converting transformer 1 is zero. As the result, when both of the transistors are on, the collector currents increase sharply. FIG. 4 shows this state. FIG. 4(a) and FIG. 4(b) show the collector-emitter voltages, and FIG. 4(c) and FIG. 4(d) shows the collector currents. These spike currents are another factor for decreasing the efficiency and reliability of the circuit.

An object of the present invention is to make the operating frequency constant in spite of load fluctuations.

Another object of the invention is to provide base currents which are in proportion to the collector currents.

A further object of the invention is to eliminate the spike collector currents caused by the simultaneous on state of both transistors.

In order to attain the first and the second objects, another current transformer is added in parallel to the driving transformer 11. In order to attain the third object, a small inductance is added in series with the resistor 18.

FIG. 5 shows a circuit of the present invention. A fundamental structure of the circuit in FIG. 5 is almost the same as the circuit of FIG. 3. The current feedback transformer 21 is composed of two windings 17 and 19 through which the collector currents flow and two windings 22 and 23 which provide base currents which are in proportion to the collector currents through diodes 24 and 25. In FIG. 5, the operating frequency is fixed by the transformer 11. The base currents are supplied from the current transformer 21 so as to saturate the transistors. Thus, the operating frequency is constant for load regulation and the transformer 11 can provide less energy to the bases of the transistors then in conventional systems. In FIG. 5, a small inductance 20 is connected in series with the resistor 18. The inductance works as a time delay element. The inductance 20 delays the transmission time of energy from the winding 5 to the winding 14. As the result thereof, the spike currents of transistors 8 and 9 are eliminated.

Figure 6:
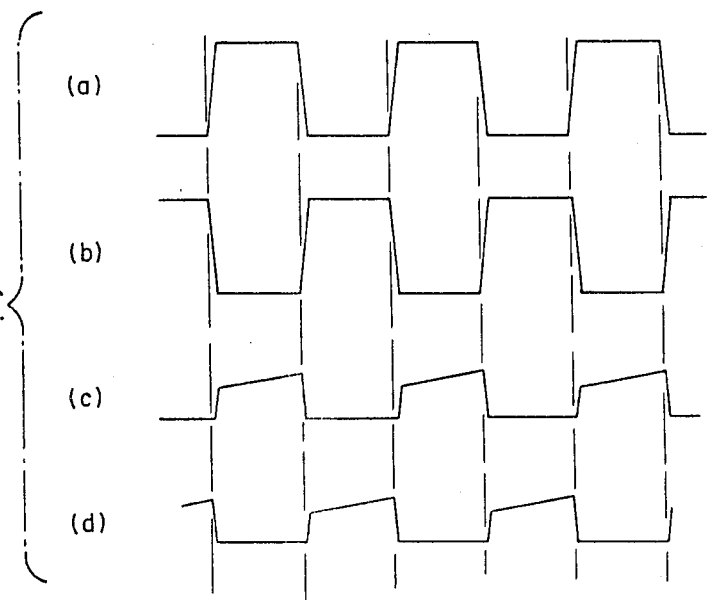
FIG. 6 shows operating waveforms of the circuit in accordance with the present invention.

FIG. 6 shows operating waveforms of the circuit of FIG. 5. FIG. 6(a) and FIG. 6(b) show the collector-emitter voltage waveforms and FIG. 6(c) and FIG. 6(d) show the collector current waveforms. In FIGS. 6(a)–6(d) the turn on and the turn off times are magnified with respect to the operating time.

Figure 7:
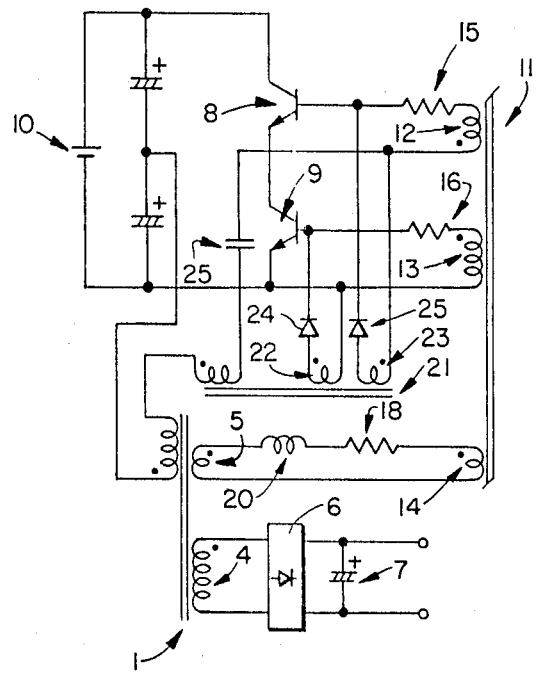
FIG. 7 and FIG. 8 show other embodiments of the present invention.

FIG. 7 shows another circuit in accordance with the present invention. The circuit in FIG. 7 is called a "half-bridge self-oscillating DC to DC converter".

Figure 8:
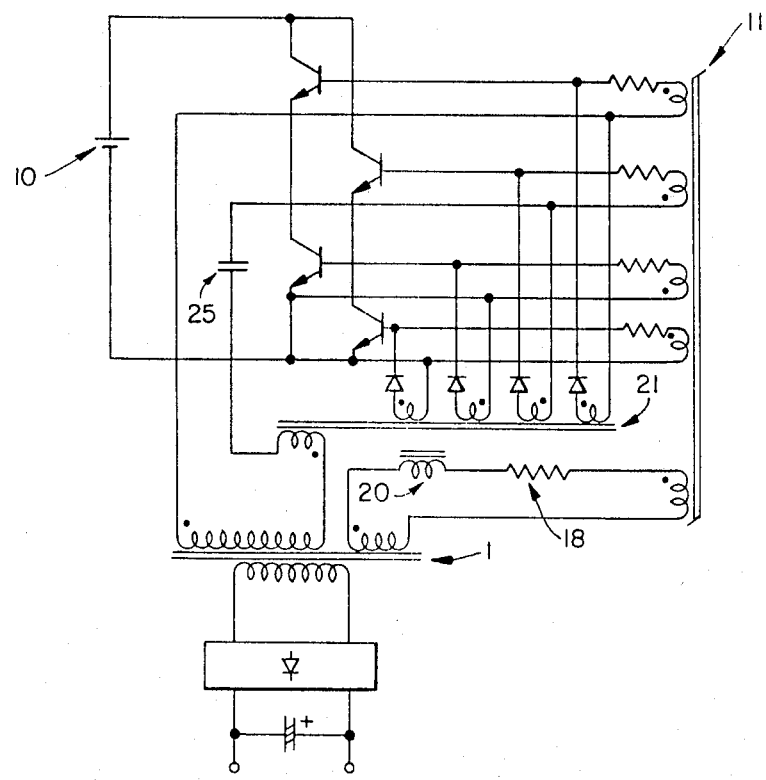

FIG. 8 shows still another circuit in accordance with the present invention. The circuit in FIG. 8 is called a "full-bridge self-oscillating DC to DC converter". In FIGS. 7 and 8, the presence or absence of capacitor 25 does not affect the invention. In view of the foregoing, it is possible to get a higher efficiency and reliability by means of the present invention.

What is claimed is:

1. A self-oscillating DC to DC converter comprising:
at least one pair of transistors;
a converting transformer having primary and secondary windings for transferring energy to a load through a rectifier means by self-oscillating said at least one pair of switching transistors;
a driving transformer having windings for providing base currents to said at least one pair of switching transistors through a resistor and an inductance which are connected in series between said secondary winding of said converting transformer and one of said windings of said driving transformer; and a current transformer for providing additional base currents to said at least one pair of switching transistors which are in proportion to collector currents of said at least one pair of switching transistors.

2. A self-oscillating DC to DC converter as claimed in claim 1, further comprising a capacitor which is connected in series with said primary winding of said converting transformer.

* * * * *